United States Patent
Dolmayan

(10) Patent No.: US 12,014,381 B2
(45) Date of Patent: *Jun. 18, 2024

(54) REUSABLE, SECURE SHIPPING PACKAGE

(71) Applicant: Ship Assure, Las Vegas, NV (US)

(72) Inventor: John Hovig Dolmayan, Las Vegas, NV (US)

(73) Assignee: Ship Assure, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,080

(22) Filed: Mar. 23, 2023

(65) Prior Publication Data

US 2023/0237509 A1 Jul. 27, 2023

Related U.S. Application Data

(63) Continuation of application No. 16/994,459, filed on Aug. 14, 2020, now Pat. No. 11,631,088.

(Continued)

(51) Int. Cl.
*E05B 47/00* (2006.01)
*B65D 88/00* (2006.01)
(Continued)

(52) U.S. Cl.
CPC ....... *G06Q 30/0185* (2013.01); *B65D 88/005* (2013.01); *B65D 88/022* (2013.01);
(Continued)

(58) Field of Classification Search
CPC ................ B65D 88/005; B65D 88/022; B65D 21/0213; B65D 2203/10; B65D 2255/20;
(Continued)

(56) References Cited

U.S. PATENT DOCUMENTS

| 5,774,053 A | 6/1998 | Porter |
| 7,164,384 B2 | 1/2007 | Howard |

(Continued)

FOREIGN PATENT DOCUMENTS

| CN | 104129562 A | 11/2014 |
| EP | 3428861 A1 | 1/2019 |

(Continued)

OTHER PUBLICATIONS

"Box Lock Protect Your Packages Before you hit the road this summer", Boxlock, Inc. (2019).

(Continued)

*Primary Examiner* — Dionne Pendleton
(74) *Attorney, Agent, or Firm* — Perkins Coie LLP; Michael Glenn; Vikram Iyengar

(57) ABSTRACT

Disclosed herein is a shipping container that includes numerous multi-factor authentication (MFA) tie ins to provide added security to the container. In some embodiments, the shipping container is associated with a mobile user profiles within a mobile application. A retailer makes a sale, then, using a mobile application, associates the container with the destination address and the MFA details associated with the buyer's mobile application account. Once the container is loaded up, the container will not open again except for the buyer using the buyer's MFA authentication credentials.

20 Claims, 8 Drawing Sheets

Related U.S. Application Data

(60) Provisional application No. 62/945,409, filed on Dec. 9, 2019.

(51) Int. Cl.

| | |
|---|---|
| *B65D 88/02* | (2006.01) |
| *G06F 21/32* | (2013.01) |
| *G06K 7/14* | (2006.01) |
| *G06Q 10/083* | (2023.01) |
| *G06Q 30/018* | (2023.01) |
| *G07C 9/00* | (2020.01) |
| *H02J 7/02* | (2016.01) |
| *H02J 50/10* | (2016.01) |
| *G06Q 50/26* | (2012.01) |

(52) U.S. Cl.
CPC .............. *E05B 47/00* (2013.01); *G06F 21/32* (2013.01); *G06K 7/1413* (2013.01); *G06K 7/1417* (2013.01); *G06Q 10/0838* (2013.01); *G07C 9/00563* (2013.01); *G07C 9/00896* (2013.01); *H02J 7/02* (2013.01); *H02J 50/10* (2016.02); *E05B 2047/0058* (2013.01); *E05B 2047/0061* (2013.01); *G06Q 50/265* (2013.01); *G07C 2009/0092* (2013.01)

(58) Field of Classification Search
CPC .......... B65D 43/22; B65D 43/26; B65D 1/22; B65D 81/00; E05B 2047/0058; E05B 2047/0061; E05B 2047/0094; E05B 47/00; E05B 51/00; G06F 21/32; G06F 21/64; G06F 21/35; G06K 7/1413; G06K 7/1417; G06Q 10/0838; G06Q 30/0185; G06Q 50/265; G06Q 10/06316; G06Q 10/087; G06Q 20/203; G06Q 20/3274; G06Q 20/3278; G06Q 20/34; G06Q 20/4012; G06Q 20/40145; G06Q 50/08; G07C 2009/0092; G07C 9/00563; G07C 9/00896; G07C 9/00912; G07C 9/20; G07C 9/00; H02J 50/10; H02J 7/02; H04B 5/0037; H04B 5/79; A61J 1/03; A61J 2200/70; A61J 2200/72; A61J 2205/10; A61J 2205/60; A61J 7/0418; A61J 7/0445; A61J 7/0454; G07F 11/62; G07F 17/0092; G07F 17/12; G07F 5/26; G07F 9/026; G16H 20/13; G16H 40/20; G16H 40/40; E05G 1/005

See application file for complete search history.

(56) References Cited

U.S. PATENT DOCUMENTS

| | | | |
|---|---|---|---|
| 7,484,391 B1 | 2/2009 | Moore | |
| 7,538,681 B1 | 5/2009 | Sharma et al. | |
| 8,022,573 B2 | 9/2011 | Powers et al. | |
| 9,154,486 B1 | 10/2015 | Saylor et al. | |
| 10,410,451 B1 | 9/2019 | Khalil et al. | |
| 11,631,088 B2* | 4/2023 | Dolmayan ........... B65D 88/022 340/5.53 | |
| 2002/0087429 A1 | 7/2002 | Shuster | |
| 2004/0222222 A1 | 11/2004 | Parnall et al. | |
| 2005/0275553 A1 | 12/2005 | Weekes | |
| 2010/0251785 A1 | 10/2010 | Zarei | |
| 2010/0326145 A1 | 12/2010 | Powers et al. | |
| 2010/0332359 A1 | 12/2010 | Powers et al. | |
| 2013/0312450 A1 | 11/2013 | Iwasa et al. | |
| 2015/0379796 A1* | 12/2015 | Glasgow ........... G07C 9/00571 340/5.51 | |
| 2017/0021998 A1 | 1/2017 | Flint et al. | |
| 2017/0074002 A1 | 3/2017 | Cooper | |
| 2017/0091710 A1 | 3/2017 | Van Dyke | |
| 2017/0262798 A1 | 9/2017 | Kosseifi et al. | |
| 2019/0019144 A1 | 1/2019 | Gillen | |
| 2019/0359400 A1 | 11/2019 | Pariente-Cohen et al. | |
| 2021/0142631 A1 | 5/2021 | Bella et al. | |
| 2021/0201256 A1 | 7/2021 | Rahilly et al. | |

FOREIGN PATENT DOCUMENTS

| | | |
|---|---|---|
| IN | 105377088 B | 9/2016 |
| JP | 2007233884 A | 9/2007 |
| JP | 2010089967 A | 4/2010 |
| WO | 0151744 A2 | 7/2001 |

OTHER PUBLICATIONS

"Fireproof Lock Box, Bag for Documents", Amazon Prime, 9 pages.
"LivingPackets, The Box", downloaded from https://www.livingpackets.com on Aug. 14, 2020, 15 pages.
"Locking Parcel Box", Amazon Prime search result, 11 pages.
"Magnetic Products Inc. DVA Aluminum Safe Box for High Value FedEx Parcels—Extra Security with Combination Lock—by (MPI)—ShipSafe Box Medium with Key", Amazon Prime, 7 pages.
"Slot-Lock Containers—Industrial Packaging", Product Page, Packnet Ltd. (2019).
European Search Report dated Dec. 21, 2023 cited in EP Application No. 20900421.7, 10 pages.

* cited by examiner

REUSABLE, SECURE SHIPPING PACKAGE

CROSS-REFERENCE TO RELATED APPLICATION(S)

This application is a continuation of U.S. patent application Ser. No. 16/994,459, filed Aug. 14, 2020, which claims priority to U.S. Provisional Application No. 62/945,409, titled "Reusable, Secure Shipping Package" and filed on Dec. 9, 2019, which are incorporated by reference in their entireties herein.

TECHNICAL FIELD

Disclosed herein are reusable, secure shipping containers. More specifically packages including external authentication means.

BACKGROUND

Businesses that ship items by mail have a regular source of loss in stolen goods during transit and/or fraudulent transactions with customers acting in bad faith. Significant profit is lost post shipping items through reimbursements whether legitimate or fraudulent.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Embodiments of the invention were born of the necessity to provide for secure shipping that prevents the loss that occurs either by fraudulent transactions or theft. Embodiments of the invention provide a safe, secure, and affordable global shipping enhancement. Embodiments initially create a tamper proof inexpensive and reusable shipping container. Embodiments initially comprise the most commonly shipped container sizes (e.g., the five or more most commonly used container sizes).

Figure 1:
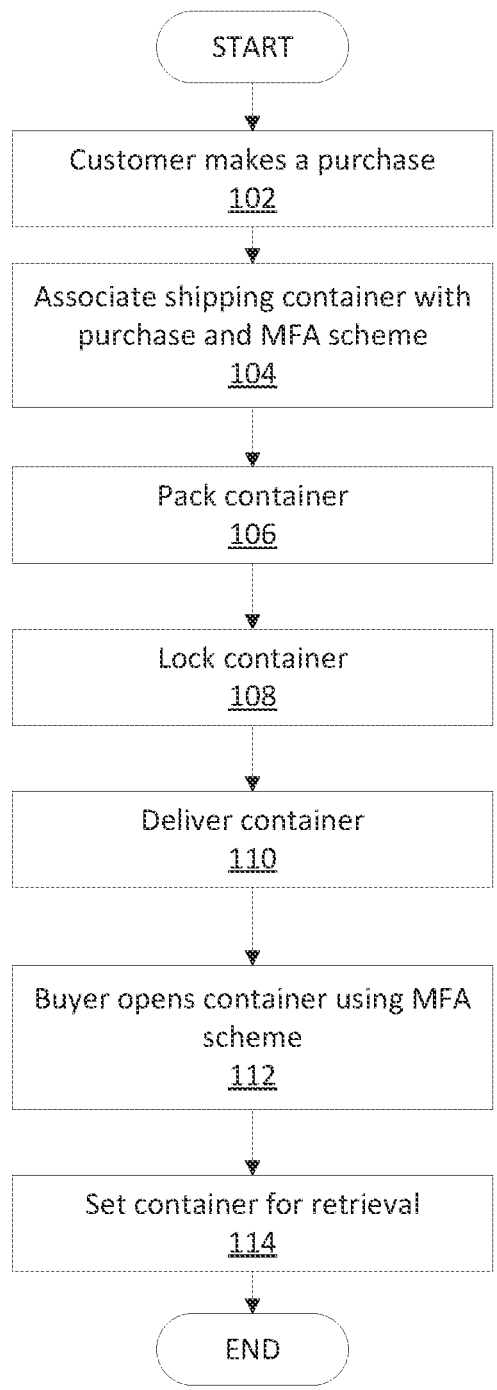
FIG. 1 illustrates a method of shipping using a secure shipping container.

FIG. 1 illustrates a method of shipping using a safe ship container. In practice, in step 102, the customer, international or domestic, makes a purchase (e.g., via an online store or through an app). The customer selects a ship safe option and verifies their identity via multi-factor authorization (MFA). Examples of MFA include out-of-band passwords, fingerprint, voice recognition, or facial recognition technologies (e.g., as verified via an associated mobile device). The MFA elements may be associated with a given user via a store account profile. The store connects the user to a mobile device and the mobile device includes a linked identity scan.

In step 104, once the purchase is completed with an associated MFA scheme, the retailer associates the purchase with a particular safe ship container. In some embodiments, the association of the purchase with the safe ship container may include using a scanner that includes transaction data to scan a machine-readable code on the exterior of the particular safe ship container. Examples of the machine-readable code include barcodes, UPCs, and QR codes. Embodiments of a scanner may include a mobile device such as a smart phone that includes a camera and executes retailer software.

During association of container with completed purchase, the retailer software may include associating a shipping address with the container. In some embodiments, any user may use the retailer application and a smart phone to scan the machine-readable code on the container and the application displays the shipping information in response. In some embodiments, when the container is associated with the completed purchase, the container sets a status flag to "primed for loading." There is no longer be a need for filling out paper work by hand or attempting to read information address information that is poorly written or relying on employees being infallible. All pertinent information will be filled out in advance with said information stored in a backend server that associates the delivery information with the container, and/or in a container memory accessible via either a container interface or a mobile application.

In step 106, the retailer then packs the customer's items in a safe ship container. The process of packing includes a short (e.g., 3-second) video of the safe ship container being locked. In some embodiments the camera that films the packing video is mounted on the safe ship container aimed at the lock and the opening of the container (e.g., and captures goods placed inside the container). In some embodiments, the camera may include multiple perspectives (both external and internal).

In some embodiments, the recording function of the camera (e.g., a CMOS) is activated by a motion sensor or via detected movement by the camera itself. Other triggers for the camera optionally include that the container has a "primed for loading" status. When the camera is enabled to record, the camera may begin retroactively recording moments (e.g., seconds) prior to being triggered. Retroactive recording is enabled via a video buffer.

In step 108, when the container is closed and locked, the video ends. Once locked, the container sets a status flag to "transit." Once the customer gets confirmation and the package is collected, (e.g., by DHL, Fed Ex, USPS, Amazon, etc.), the retailer's responsibility is satisfied going forward. The packing video is uploaded to a backend server and may be accessed by both the retailer and the recipient via the application and/or retailer store web page.

In step 110, the container is delivered to the address provided by the customer. In some embodiments, the progress of the container is tracked via GPS. In order to reduce battery consumption, the container may only activate the GPS periodically, and/or while connected to a power source. Rather than a tracking number, the container ID that is associated with the machine-readable code on the exterior of the container is used to identify and track the shipping progress of the container. In step 112, Only the customer, an approved recipient, or an inspection agent (e.g., customs) can open the safe ship container, thus eliminating most cases of fraud and theft.

Various embodiments release the lock mechanism a number of ways. In some embodiments, the lock mechanism is released via wireless signals originating from an authentication application, wherein the authentication application pairs authentication data with a shipping container ID, the authentication application configured to receive authentication data from a user (e.g., the MFA scheme). In some embodiments the lock mechanism is released based on satisfaction of a code entered into a keypad either associated with the mobile device application or located on the container body.

In some embodiments, the container wirelessly communicates to a backend server as a client device, and the recipient similarly communicates to the backend server via their mobile device. In some embodiments, the container must be within a threshold distance of the delivery address (verified by GPS) to be unlocked.

The receiving party may allow a guest of their choosing to open the container using the same application/technology on a per use basis. Customs officials are provided a government version of the application that allows them access to the contents of the shipping container for the purpose of inspection. The customs officer will be identified as having inspected the package and is responsible for replacing any items and relocking the package with the same three second video showing proof of unmolested contents. The same process can be used by shipping companies if dangerous materials are thought to be in transit, if needed.

Examples of MFA scheme credentials may include two or more of:

Container location verification;

On container biometric sensor satisfaction (e.g., fingerprint, facial, iris, or voice print sensor);

On associated mobile biometric sensor satisfaction (e.g., fingerprint, facial, iris, or voice print sensor);

On container keypad code;

On mobile application keypad code;

Co-location of container and mobile device logged into associated mobile application;

Command from mobile device logged into associated mobile application;

In step 114, where the container is opened by a user with the recipient's means of access (e.g., various out-of-band and MFA schemes), the container sets a status flag to "delivered."

Global access and marketplace for small and large retail businesses made available in a cost-effective manner. There is little to no cost to the retailer. In step 116, once the container has been emptied the recipient simply places it outside on their porch with an automated notification based on the status flag of the container going to the deliverer of the container's instant availability. The GPS unit on the container enables the carrier to retrieve the container.

Embodiments of the invention eliminate the need for hand written applications and shipping/receiving addresses. Users will complete shipping and receiving information (and billing) on a mobile application. They may even pay the shipping cost in advance. The container includes have a machine-readable code that is be scanned by delivery agents, as well as a number code on each unit. There is be an automated process using the herein disclosed technology that will creates the most efficient delivery order with the containers placed by order of closest to furthest automatically on the delivery platform/vehicle. As vehicles become automated, this will enable the delivery agent to sit in the back of the vehicle in order to speed the efficiency of the process.

Figure 2:
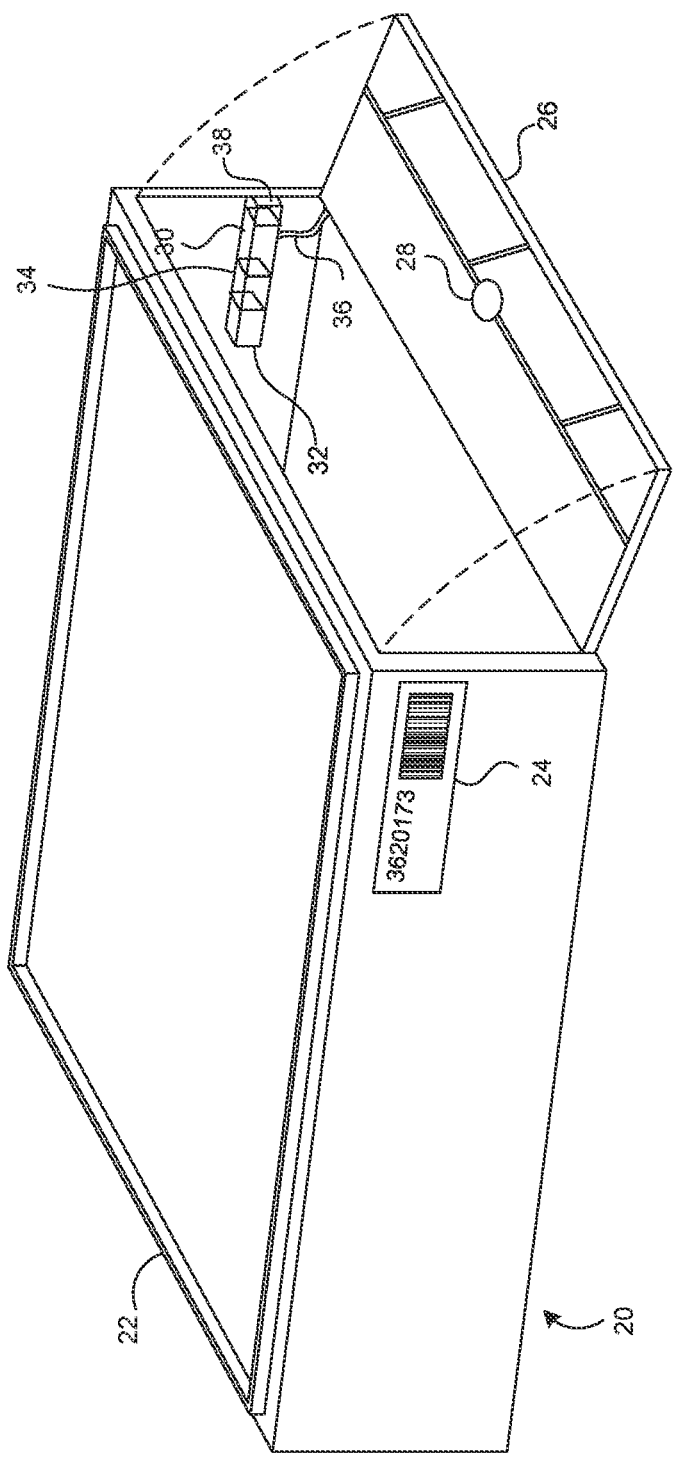
FIG. 2 is a perspective view of a reusable, secure shipping container.

FIG. 2 is a perspective view of a reusable, secure shipping package 20. The containers are uniform, and stack securely using nested, force fit, ridges 22 similar to Lego's. The container 20 being easily stackable makes the containers 20 easier to ship, store, and use. A machine-readable code (e.g., a bar code and serial number) 24 are provided to uniquely identify the container. In some embodiments, the code labelling on the exterior of the container 20 is the only marks on the exterior. Where an address is associated with a mobile application user account (e.g., a user profile of the recipient), there is no need to mark the container 20 with a shipping address. Instead, delivery information is obtained via scanning with a mobile application enabled device.

A hinged front door 26 includes an interior locking mechanism 28 and an electronic lock control 30 that, in some embodiments, includes a GPS unit 32. A battery powers 34 the control unit 30 and a wire 36 connects the control unit 30 to the interior locking mechanism 28. In some embodiments, the battery 34 and control unit 30 may be integrated into the door 26. The container 20 further includes a wireless transceiver 38 that enables the container 20 to communicate with a backend server (not pictured) and/or a user's mobile device via a mobile application.

In embodiments of the invention, the control unit 30 may include one or more biometric sensors, such as a fingerprint, iris, or voice print sensor (on an exterior of the container 20), or other MFA sensors (e.g., NFC or RFID reader) to identify an authorized recipient for purposes of opening the container. The GPS unit 32 may compare a current location with an authorized location, such that the container 20 may only be opened at a pre-approved destination and, with the biometric sensors or via a mobile application, it only may be opened by an authorized person at that location. The GPS unit may also provide tracking information for the container and can trigger an alarm if the container is diverted from its delivery path or destination (e.g., as identified via the mobile application). The alarm may be either or both of an internal alarm in the package and a remote alarm triggered by a transmitter within the package. The alarm connects with a mobile application that the container 20 has been associated with. Further, the wireless transceiver 38 may serve as a beacon to notify the shipper when the package has been properly opened and is ready to be reused. The wireless transceiver 38 may communicate with local WiFi networks, local cell networks, or other suitable, and accessible wireless networks known in the art.

The container 20 is of a set of standard sizes that are commonly used for package delivery. In some embodiments, at least one dimension of the container 20 is extendable via a telescoping housing. Multiple layers of housing may slide like interlocking plates to extend the length of the given dimension. A internal container tightening mechanism locks the telescoping dimension to a particular desired size for transit.

Figure 3:
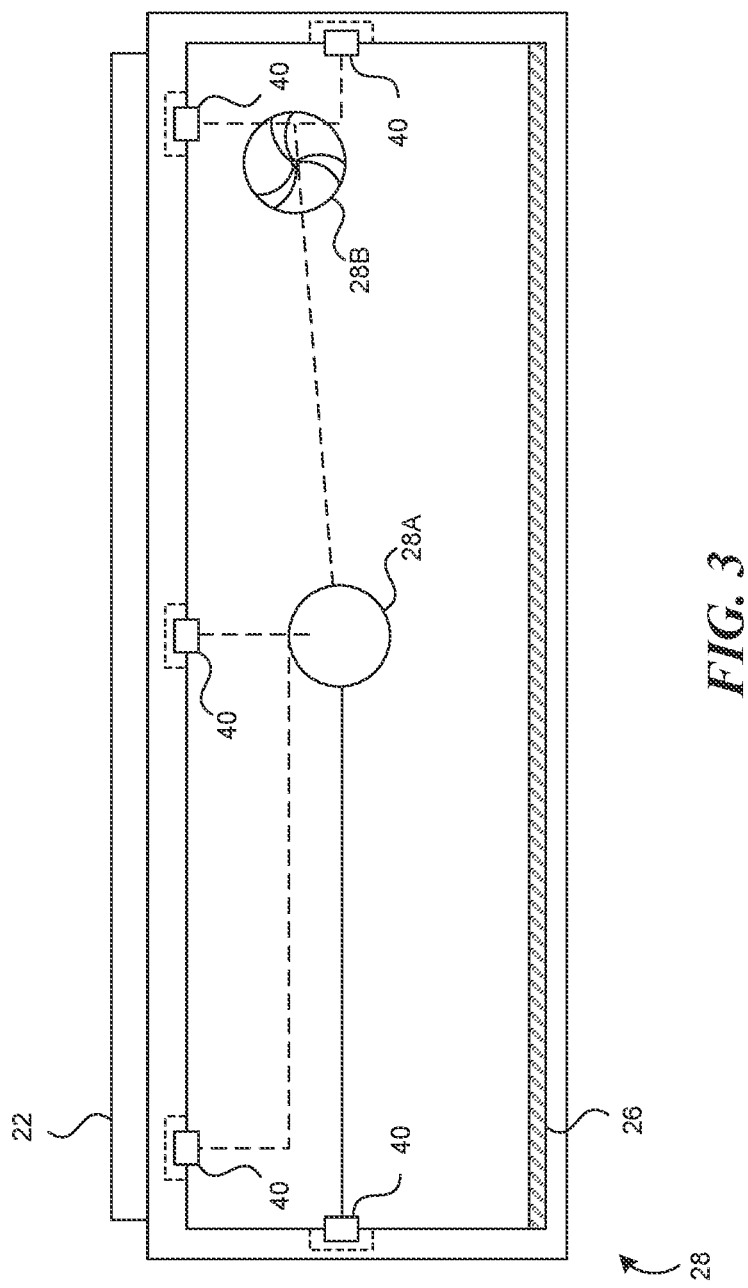
FIG. 3 is a front view of a reusable, secure shipping container.
Figure 4:
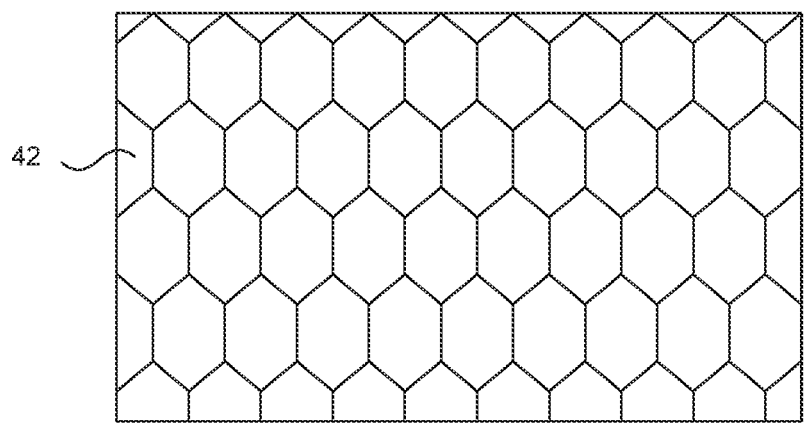
FIG. 4 is a cross section showing a honeycomb shell used in construction of the reusable, secure shipping container.

FIG. 3 is a front, see through view of the reusable, secure shipping container 20. In FIG. 3, an exemplary locking mechanism includes locking channels 40, an inner locking mechanism 28A, and an outer locking wheel or electronic lock 28B. The electronic lock 28B may include one or more of a keypad that requires entry of an unlock code, a biometric sensor, a camera, an NFC or RFID reader, a signal from an app on a recipient's smart phone, a confirming signal from the shipper that is sent as part of a two-factor authentication scheme, and the like, FIG. 4 is a cross section illustrating a honeycomb shell 42 used in construction of some embodiments of the reusable, secure shipping container 20. The honeycomb shell 42 material is strong and light. Thus, the container resists intrusion attempts and rough handling while in transit, yet it is light to reduce shipping costs. In embodiments, the container can be assembled from modular elements. For example, interlocking sides, top, bottom, front, and back pieces may be combined to make containers of various sizes. The honeycomb structure may be constructed of light weight carbon fibers, graphene, steel alloys, aluminum alloys, titanium alloys, metallic micro lattice, and other suitable materials known in the art weight low weight and high strength.

In some embodiments, the container housing around regions including locking mechanisms, wiring, and/or electronics include a solid surface in order to prevent tampering with those components.

In some embodiments, a solid panel is positioned externally and/or internally of the honeycomb lattice 42 and prevents visibility into the contents of the container and prevents bad actors from getting leverage on the holes (e.g., sticking fingers or rods into) in the honeycomb lattice 42.

Figure 5:
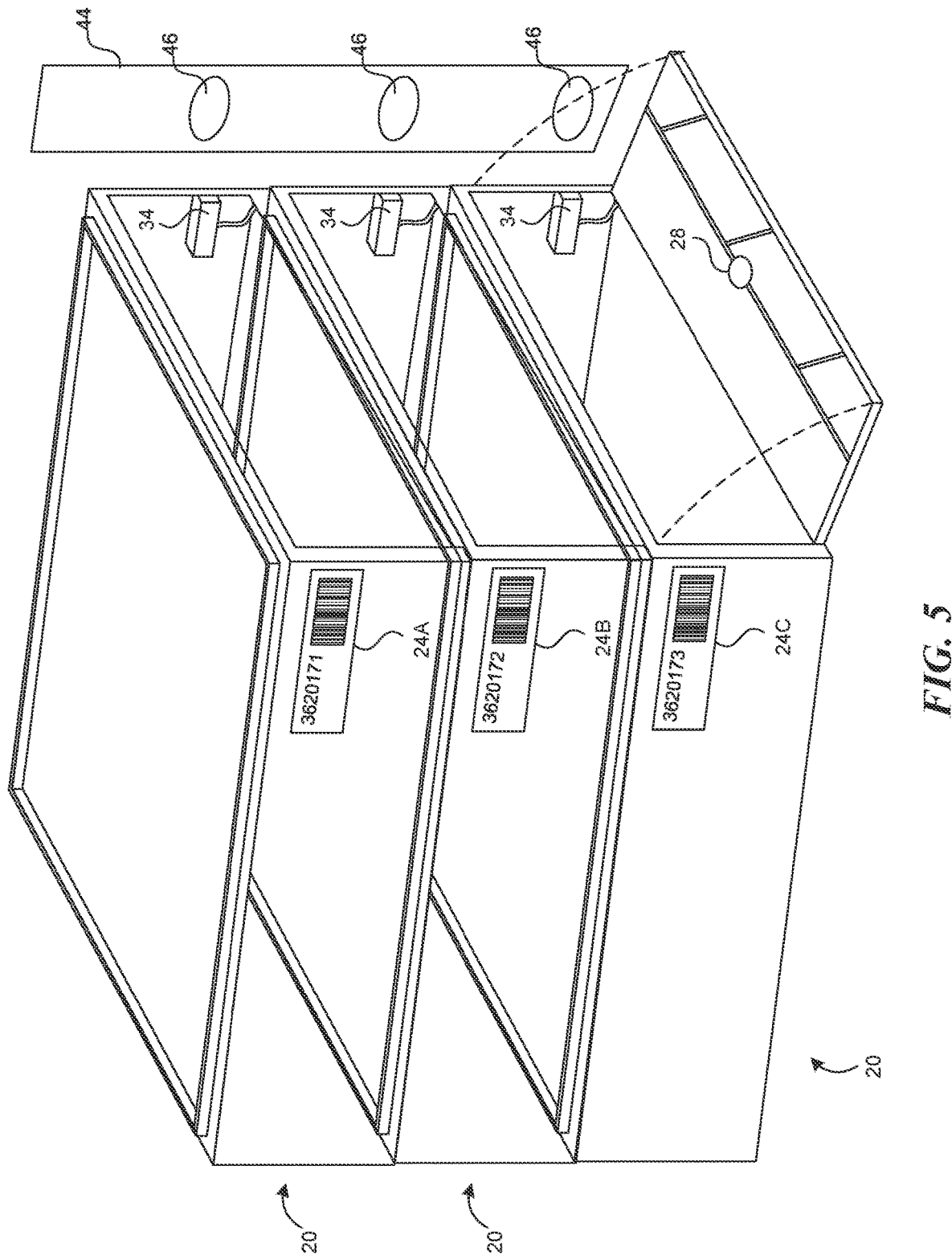
FIG. 5 is a perspective view of a set of stacked secure shipping containers aligned with a charging apparatus.

FIG. 5 is a perspective view of a set of stacked secure shipping containers aligned with a charging apparatus. Three shipping containers 20 are stacked upright and are positioned next to a wireless charging apparatus 44. The wireless charging apparatus 44 makes use of electromagnetic induction to charge batteries next to the wireless charging apparatus 44. The wireless charging apparatus 44 is arranged vertically and include charging nodes 46 positioned aligned with the batteries 34 of the stacked containers 20.

In transit, a delivery vehicle or staging area may include the wireless charging apparatus 44 in order to maintain charge on the containers 20 without the necessity of the sender or recipient taking any time to charge the containers 20. Thus, by the act of being transported according to a correct procedure will cause the container 20 to charge.

Through the use of standardized containers 20, the batteries 34 are each is expected positions and align with charging nodes 46 at similarly standardized positions.

Figure 6:
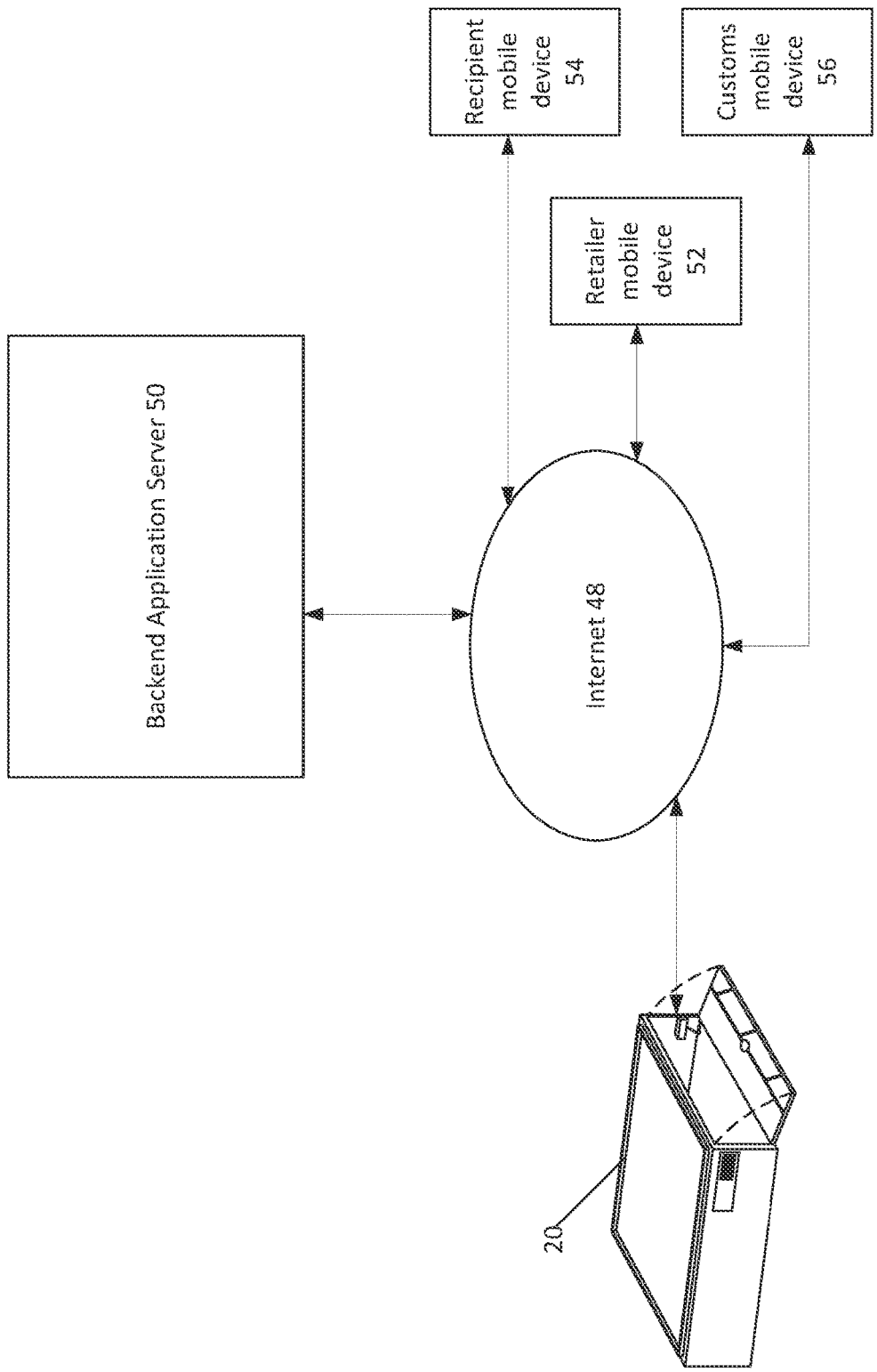
FIG. 6 is a block diagram of an associated delivery system implementing secure shipping containers.

FIG. 6 is a block diagram of an associated delivery system implementing secure shipping containers. The shipping container 20 communicates via the Internet 48 with a backend application server 50, a retailer mobile device 52, a recipient mobile device 54, and in some cases, a customs agent mobile device 56. Each of the mobile devices 52, 54, 56 operate a mobile application that associates the container 20 with particular purchase data. The purchase data is first obtained by the retailer in response to a sale to the recipient. The recipient has a user profile in the mobile application that designates the relevant credentials for the MFA scheme.

Figure 7:
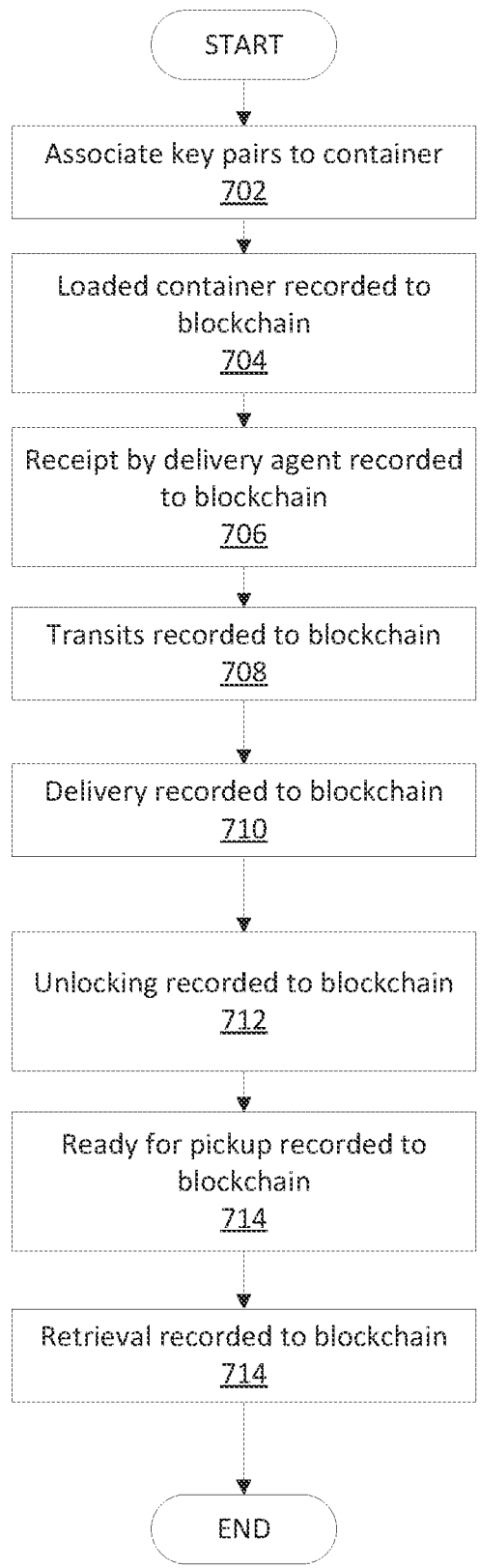
FIG. 7 illustrates a method of blockchain tracking integration.

FIG. 7 illustrates a method of blockchain tracking integration. In some embodiments, at each point of interaction, the mobile application records the respective interaction to a blockchain database.

Embedding data in a blockchain ledger, such as the Bitcoin/Ethereum/Hyperledger blockchain, is used in cryptocurrency applications. Every cryptographic blockchain transaction contains input(s) and output(s). Ethereum and other coins may also include smart contracts associated with transactions. Cryptocurrencies and non-coin-based ledgers allow an output to contain arbitrary data, simultaneously identifying that it is not a spendable output (not cryptocurrency being transferred for a later redemption).

The arbitrary data may be a hashed code that contains a significant amount of data. As long as the submitted transaction is a valid transaction, that transaction ("encoded transaction") will be propagated through the network and mined into a block. Data mined in blocks is immutable. This allows data to be stored with many of the same benefits that secure the blockchain. Everything disclosed herein with reference to distributed ledger applications and technology may also be leveraged on permissioned blockchains in absence of cryptocurrency tokenization, for example on Hyperledger Fabric, with smart contract capabilities.

Once data is stored in the permissioned ledger or blockchain ledger (especially on the Bitcoin/Ethereum/Hyperledger main chain), it is exceedingly difficult to remove or alter that data. In this sense, a blockchain ledger is immutable. In order to make changes to posted blocks to the Bitcoin blockchain, one must control 51% of the mining power of the network. Because the number of Bitcoin nodes is in the thousands, the Bitcoin blockchain is effectively immutable. In some embodiments, and in privately controlled cryptocurrencies, the records stored on the respective ledgers are more susceptible to hijack or take over as a result that nodes are less numerous. However, the risk is low, and properly administered blockchain ledgers, be they public or private, are considered immutable.

The resulting effect is that whoever creates the transaction with the data can prove that they created it, because they hold the private key used to sign the transaction. Disclosed herein, proof of personal connection to the genomic key through zero-knowledge proofs also proves that a given user was party to a transaction. Additionally, the user can prove the approximate time and date the data became part of the blockchain ledger.

The system works both with public blockchain ledgers (for the purposes of this disclosure immutable cryptographic ledgers are referred to as merely "blockchains"), like Bitcoin and Ethereum, Hyperledger, and with private blockchains.

In operation, each time the container is scanned and looked at using the associated mobile application, a transaction record is created on the blockchain. The transaction record includes metadata including who scanned the container (e.g., based on the mobile application's user profile) and what that user's role is relative to the container (e.g., sender, recipient, delivery agent, customs agent, etc.).

Occurrences of container scanning include scans/check-ins along the delivery route, as well as original loading, and door lock status. Where video is recorded via cameras on the container, the video is uploaded to the blockchain database, and is accessible via the mobile application.

Security of users associated with the blockchain is maintained via cryptographic key pairs. Cryptographic key pairs include a public and private key. The public key is used to identify a given user, whereas the private key is used to decrypt private data intended for the user associated with the respective public key. The key pairs are cryptographically related such that In step 702, where a purchase completes that identifies use of a secure shipping container, a blockchain record begins for the container asset. The blockchain record includes the relevant public keys to the transaction (e.g., the seller and the recipient). The relevant public keys are only associated with the container asset for a limited set of recorded transactions.

While the container asset is a digital representation that is recorded and logged on the blockchain, the container asset directly corresponds to a real-world container. Because the containers are reused, privacy of purchases need be maintained. In order to retain privacy, the blockchain transactions are only decipherable by a user with a private key associated with one of the public keys attached to the transaction. The transactions accessible by those private keys are limited in scope and connected to the series of transactions connected with the present instance of delivery only. As a blockchain data structure is immutable, the delivery transaction records for all uses of the container asset remain logged on the blockchain, but only those transactions pertaining to the container deliveries associated with a given user may be deciphered by that user. In this manner, the privacy of each user's delivery of the container remains private.

Delivery agents and customs agents have key pairs that are not expressly associated with a given series of transaction records for the container but are still able to access the records for each container (across multiple uses of the container) using their respective private keys.

The mobile application operates opaquely tom the blockchain data. That is, users do not specifically handle their cryptographic key pair. The mobile application ties the relevant key pairs to user profiles and login information. Authorized devices and/or a backend application server communicating with the authorized devices issue the relevant cryptographic key automatically in response to data requests in the user interface of the mobile application.

In step 704, the container is loaded with relevant contents to ship and a video of the loading step is upload to the blockchain. The blockchain record is encrypted, and only decipherable by those with associated private keys (and/or delivery and customs agents).

In step 706, the container is received by a delivery agent and scanned as received. The receipt by the delivery agent is similarly recorded on the blockchain. In step 708, the container transits to the delivery destination and at each stop (e.g., postal center along the way), the container is scanned, and the location is recorded to the blockchain. In step 710, the container is delivered, and the delivery agent scans again logged the delivery to the blockchain.

In step 712, the recipient uses their credentials to unlock the container and the unlocking is stored to the blockchain. In some embodiments, the blockchain record pertaining to the unlocking includes reference to the type of MFA scheme credentials used to unlock the container. In some embodiments, where the container uses facial recognition as part of the MFA scheme, the image used to capture the recipients face may be logged to the blockchain where the sender can access the image.

In step 714, the recipient marks the container ready for pickup and the status is recorded to the blockchain. In step 716, a delivery agent picks up the container and the pickup is recorded to the blockchain as well. The transaction record of step 716 is the last transaction for the present delivery iteration and the last that the public keys associated in step 702 are connected with. In most cases, the next recorded transaction for the container will have new public keys associated therewith.

Computer System

Figure 8:
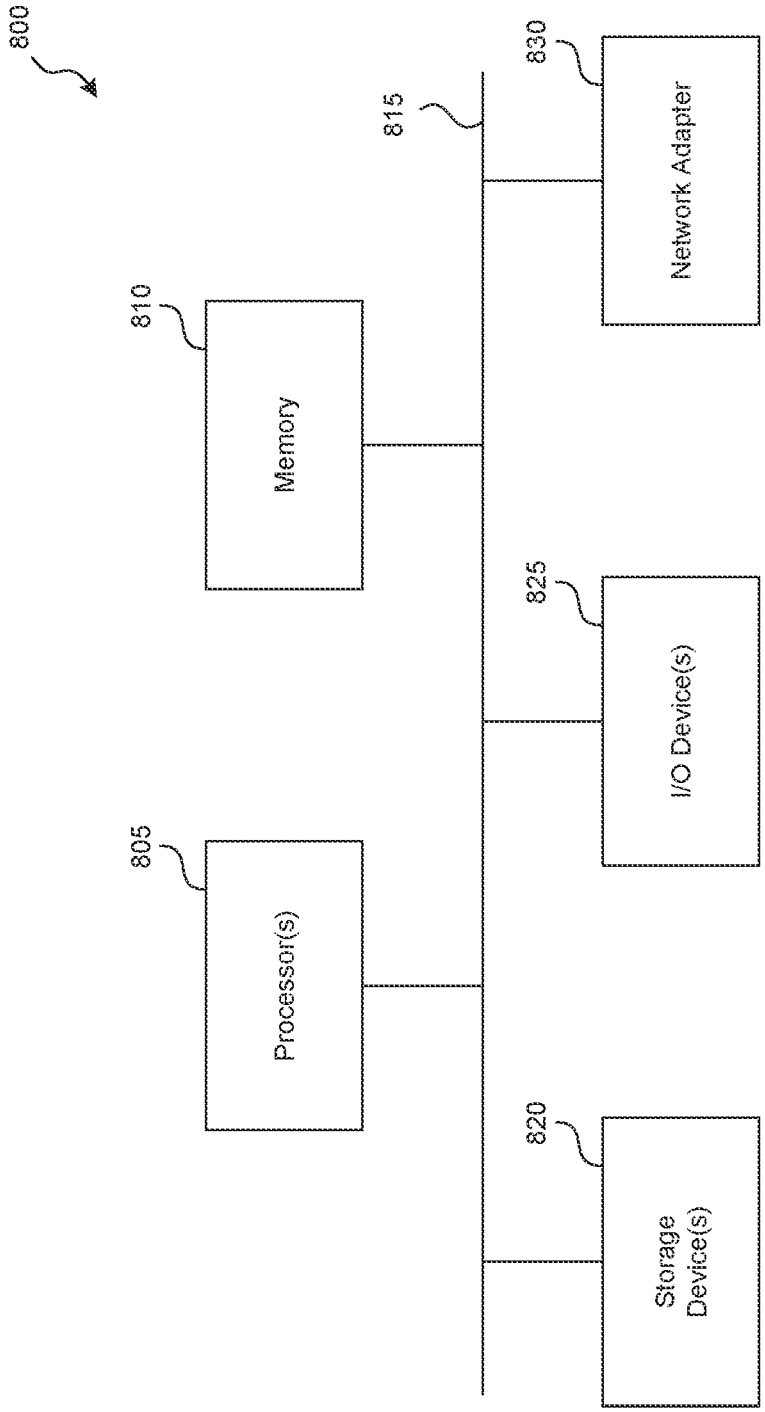
FIG. 8 shows a diagrammatic representation of a machine in the example form of a computer system within which a set of instructions for causing the machine to perform one or more of the methodologies discussed herein may be executed.

FIG. 8 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an Android Phone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 800 may include one or more central processing units ("processors") 805, memory 810, input/output devices 825, e.g., keyboard and pointing devices, touch devices, display devices, storage devices 820, e.g. disk drives, and network adapters 830, e.g. network interfaces, that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 810 and storage devices 820 arc computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer-readable media can include computer-readable storage media, e.g. non-transitory media, and computer-readable transmission media.

The instructions stored in memory 810 can be implemented as software and/or firmware to program the processor 805 to carry out actions described above. In some embodiments, such software or firmware may be initially provided to the processing system 800 by downloading it from a remote system through the computing system 800, e.g. via network adapter 830.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The invention claimed is:

1. A method of configuring a shipping container, comprising:

initializing the shipping container via a scan of a shipping container ID using a sender mobile application, wherein the shipping container comprises a lock associated with the shipping container, and the shipping container comprises a wireless transceiver configured to cause activation or deactivation of the lock and communicate with an authentication application configured to receive authentication data from a user;

entering, via the sender mobile application, delivery instructions that associate the shipping container with a receiver mobile application;

sealing the shipping container via the lock by issued command from the sender mobile application;

unlocking the shipping container via the lock by issued command from the receiver mobile application, the receiver mobile application having received the authentication data from the user;

unlocking the shipping container via the lock by issued command from an inspector application, the inspector application associated with an override application; and generating an unlock record associated with the inspector application, wherein the unlock record is accessible via the sender mobile application and the receiver mobile application.

2. The method of claim 1, wherein the shipping container ID is described by one or more scannable labels posted on an exterior of each respective shipping container.

3. The method of claim 2, wherein the shipping container includes no other identifying markings other than the one or more scannable labels.

4. The method of claim 1, wherein the sender mobile application is further configured to store and receive a delivery instruction associated with the shipping container ID.

5. The method of claim 1, wherein the shipping container further comprises:

an externally mounted sensor configured to authenticate the user while physically present with the shipping container, wherein data collected, from the user, by the externally mounted sensor is transmitted to the sender mobile application and used to unlock the shipping container.

6. A shipping container comprising:

a lock associated with the shipping container; and a wireless transceiver configured to cause activation or deactivation of the lock and communicate with an authentication application configured to receive authentication data from a user, wherein the shipping container is configured to be:

initialized via a scan of a shipping container ID using a sender mobile application, the sender mobile application configured to receive delivery instructions, the delivery instructions associating the shipping container with a receiver mobile application;

sealed via the lock by a first issued command from the sender mobile application;

unlocked via the lock by a second issued command from the receiver mobile application, the receiver mobile application having received the authentication data from the user; and unlocked via the lock by a third issued command from an inspector application, wherein an unlock record associated with the inspector application is accessible via the sender mobile application and the receiver mobile application.

7. The shipping container of claim 6, wherein the shipping container is a first shipping container, the first shipping container further comprising:
   an external housing that aligns with a respective external housing of a second shipping container, wherein the first shipping container stacks with the second shipping container in a fixed position.

8. The shipping container of claim 7, wherein the lock is powered by a battery unit that is charged wirelessly through electromagnetic induction.

9. The shipping container of claim 8, wherein the battery unit is positioned in a standardized location and the standardized location aligns with an external induction charger configured to charge a plurality of shipping containers that are stacked on top of one another.

10. The shipping container of claim 6, wherein the shipping container ID is described by one or more scannable labels posted on an exterior of the shipping container.

11. The shipping container of claim 10, wherein the shipping container includes no other identifying markings other than the one or more scannable labels.

12. The shipping container of claim 6, wherein the authentication application is further configured to store and receive a delivery address associated with the shipping container ID.

13. The shipping container of claim 6, further comprising:
   an externally mounted sensor configured to authenticate the user while physically present with the shipping container, wherein data collected, from the user, by the externally mounted sensor is transmitted, via the wireless transceiver, to the authentication application as authentication data.

14. The shipping container of claim 13, wherein the externally mounted sensor is any of:
   a camera;
   a finger print scanner; or
   a keypad.

15. The shipping container of claim 6, wherein a set of physical dimensions of the shipping container are extendable via telescoping walls, and wherein the telescoping walls are locked into place by internally mounted locks.

16. A system comprising:
   a plurality of shipping containers, each of the shipping containers including:
   an external housing that aligns with a respective external housing of other shipping containers of the plurality of shipping containers, and
   a lock,
   wherein the shipping container is configured to be:
      initialized via a scan of a shipping container ID using a sender mobile application, the sender mobile application configured to receive delivery instructions, the delivery instructions associating the shipping container with a receiver mobile application;
      sealed via the lock by a first issued command from the sender mobile application;
      unlocked via the lock by a second issued command from the receiver mobile application, the receiver mobile application having received an authentication transmission from a user; and
      unlocked via the lock by a third issued command from an inspector application, wherein an unlock record associated with the inspector application is accessible via the sender mobile application and the receiver mobile application.

17. The system of claim 16, wherein the shipping container ID is described by one or more scannable labels posted on an exterior of each respective shipping container.

18. The system of claim 17, wherein the plurality of shipping containers include no other identifying markings other than the one or more scannable labels.

19. The system of claim 16, wherein the respective sender mobile application is further configured to store and receive a delivery instruction associated with the shipping container ID.

20. The system of claim 16, wherein each of the plurality of shipping containers further comprises:
   an externally mounted sensor configured to authenticate the user while physically present with the respective shipping container, wherein data collected, from the user, by the externally mounted sensor is transmitted to the respective sender mobile application and used to unlock the respective shipping container.

* * * * *